US012605651B2

(12) United States Patent
Kennard et al.

(10) Patent No.: US 12,605,651 B2
(45) Date of Patent: Apr. 21, 2026

(54) SEPARATOR FOR SEPARATING CONSTITUENTS OF WELL FLUID, METHOD THERFOR AND SYSTEM FOR SEPARATING CONSTITUENTS OF WELL FLUID

(71) Applicant: Expro North Sea Limited, Aberdeen (GB)

(72) Inventors: Daniel James William Kennard, Dyce (GB); Steven Kerr, Stirling (GB); Alan McNaught, Dyce (GB); Alan Thomson, Dyce (GB); Zak Foster, Dyce (GB); Jed Gray, Dyce (GB)

(73) Assignee: Expro North Sea Limited, Dyce (GB)

( * ) Notice: Subject to any disclaimer, the term of this patent is extended or adjusted under 35 U.S.C. 154(b) by 642 days.

(21) Appl. No.: 17/827,197

(22) Filed: May 27, 2022

(65) Prior Publication Data

US 2022/0379238 A1     Dec. 1, 2022

(30) Foreign Application Priority Data

May 28, 2021   (GB) ..................................... 2107693

(51) Int. Cl.
| | |
|---|---|
| *B01D 17/12* | (2006.01) |
| *B01D 17/02* | (2006.01) |
| *B01D 19/00* | (2006.01) |
| *E21B 43/34* | (2006.01) |

(52) U.S. Cl.
CPC ......... *B01D 17/12* (2013.01); *B01D 17/0214* (2013.01); *B01D 19/0068* (2013.01); *E21B 43/34* (2013.01)

(58) Field of Classification Search
CPC ................ B01D 17/12; B01D 17/0214; B01D 19/0068; E21B 43/34
See application file for complete search history.

(56) References Cited

U.S. PATENT DOCUMENTS

| | | |
|---|---|---|
| 2004/0011748 A1 | 1/2004 | Amado |
| 2004/0173266 A1 | 9/2004 | Burris |
| 2010/0140140 A1 | 6/2010 | Allouche |

FOREIGN PATENT DOCUMENTS

| | | | |
|---|---|---|---|
| CN | 207766970 U | * | 8/2018 |

* cited by examiner

*Primary Examiner* — Thuan D Dang

(57) ABSTRACT

A separator for separating constituents of well fluid produced by a well is provided. The separator includes a vessel for receiving well fluid such that a first fluid constituent overlies a second fluid constituent within the vessel, a collection pipe having an opening for collecting a first fluid constituent from the vessel, and a positioner connected to the collection pipe for rotating the collection pipe about an axis to adjust a height of the opening within well fluid in the vessel. A method and system are also provided.

18 Claims, 10 Drawing Sheets

SEPARATOR FOR SEPARATING CONSTITUENTS OF WELL FLUID, METHOD THERFOR AND SYSTEM FOR SEPARATING CONSTITUENTS OF WELL FLUID

This application claims priority to GB Patent Appln. No. 2107693.0 filed May 28, 2021, which is hereby incorporated herein by reference in its entirety.

BACKGROUND OF THE INVENTION

1. Technical Field

The subject disclosure generally relates to separators, and specifically to a separator for separating constituents of well fluid, method therefor and system for separating constituents of well fluid.

2. Background Information

After an onshore or offshore oil and gas well is drilled, and prior to production starting from the well, the well must be cleaned. Well clean-up removes, among other elements, drilling debris and fluids. After well clean-up production may be started from the well for a relatively short time in order to identify the types and magnitudes of the various components of the production fluid, and in order to estimate the production capacities of the well. These tests are commonly referred to as well testing.

A separator may be used to separate well fluids produced from oil and gas wells into gaseous and liquid components. The term fluid includes both liquids and gases. Separators may be used during well clean-up and/or well-testing. Additionally, separators may be used during production. Separators may be cascaded such that one separator is used to separate well fluids from fluid output by another separator.

Separators are generally cylindrical or spherical pressure vessels which may be horizontal, vertical or spherical. Separators may separate oil and gas (two-phase separator); oil, gas and water (three-phase separator); or oil, gas, water and solid particulate (four-phase separator). Additionally, separators can be categorized according to their operating pressure. Low-pressure separators typically handle pressures of 10 to 180 psi (69 to 1241 kPa). Medium-pressure separators may operate from 230 to 700 psi (1586 to 4826 kPa). High-pressure separators may handle pressures of 975 to 1500 psi (6722 to 10,342 kPa).

Separators typically include various internal mechanical devices to assist the separation of components such as: an inlet diverter plate, one or more coalescent plates, a vortex breaker, a mist extractor and a weir barrier. Gravity segregation in many designs is the main force that accomplishes the separation within the separator, which means the heaviest fluid settles to the bottom of the separator and the lightest fluid rises to the top of the separator. While separators may be used to separate components of well fluid, improvements are desired.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the invention may or may not address one or more of the background issues.

SUMMARY OF THE INVENTION

According to an aspect a separator for separating constituents of well fluid produced by a well is provided.

The separator may allow for fluid to be more quickly separated and/or removed from the separator. The separator may be more robust than prior art separators. The separator may be fit for use across a greater range of well fluid flow rates and/or a greater range of constituent ratios within well fluid. The separator may permit a greater level of control over separation of constituents of well fluid produced by a well.

The separator may be a gravity based separator in that a majority of fluid separation is accomplished by gravity.

The separator may comprise a vessel for receiving well fluid such that a first fluid constituent of the well fluid overlies a second fluid constituent of the well fluid within the vessel. In other words, the first fluid constituent may be above the second fluid constituent within the vessel, and the second fluid constituent may be below the below the first fluid constituent within the vessel.

The separator may comprise a collection pipe having an opening for collecting a first fluid constituent from the vessel. The first fluid constituent is collected for removal from the vessel. The opening defines an inlet for fluid collected by the collection pipe to be removed from the vessel.

The separator may comprise a positioner connected to the collection pipe for rotating the collection pipe about an axis about the positioner to adjust a height of the opening within well fluid in the vessel. The axis may be about the positioner. The axis may be perpendicular to the positioner.

The collection pipe may rotate about an axis of rotation. The axis of rotation may be defined by the positioner. The positioner may define a center or point of rotation of the axis of rotation. Thus, the collection pipe may rotate about the positioner. The collection pipe may rotate such that the longitudinal axis of the collection pipe rotates about the transverse axis of the positioner. Rotation of the collection pipe adjusts a height of the opening within well fluid in the vessel.

The positioner may define a rotation mechanism. Rotation of one or more parts of the positioner may cause rotation of the collection pipe.

The positioner may be configured for rotationally adjusting a height of the opening within well fluid in the vessel based on a detected parameter of well fluid. The parameters may be associated with: the well fluid prior to introduction into the vessel of the separator, the well fluid after introduction into the vessel, and/or fluid constituents of the well fluid.

The positioner may be configured for rotationally adjusting a height of opening within well fluid in the vessel so as to enable or permit removal of a first fluid constituent.

The height of the opening of the collection pipe is adjusted based on the detected parameter of well fluid which may improve the rate at which a first fluid constituent is removed from the vessel. Rather than wait for a first fluid constituent to reach the height of the opening, the collection pipe may be rotated to adjust the height of the opening to the level of a first fluid constituent. This may speed up removal of a first fluid constituent from the vessel of the separator. This may improve or optimize residence or retention time of a first and/or second fluid constituent within the vessel. Residence or retention time is a measure of the amount of time a liquid is in the vessel of the separator. The residence or retention time is determined by dividing the liquid volume inside the vessel by the liquid flow rate of liquid out of the vessel.

Improving, i.e. reducing, the residence or retention time may reduce the well clean up time and therefore rig time. As such, the efficiency of the well and production of well fluid may be improved.

Furthermore, the described separator may assist in preventing accidental removal of a second fluid constituent from the vessel via the opening of the collection pipe as the height of the collection pipe may be adjusted such that only a first fluid constituent is removed via the collection pipe. This may reduce waste and improve efficiency of the separator. Furthermore, the likelihood of accidental release of potentially environmentally hazardous fluids may be reduced.

The first fluid constituent may flow through the opening in the collection pipe and out of the vessel. This allows for separation of the first and second fluid constituents within the vessel.

Rotating the collection pipe to adjust the height of the opening may ensure that the geometry of the collection pipe remains substantially unchanged when the height of the collection pipe is adjusted. Thus, a first fluid constituent flowing out the vessel through the collection pipe may have a relatively smooth or constant flow rate.

Rotating the collection pipe to adjust a height of the opening may allow for a wide range of motion of the collection pipe. As such a first fluid constituent present near a lower portion of the vessel may be readily removed from the vessel. Similarly, when a level of a first fluid constituent rises to an upper portion of the vessel, a height of the collection pipe may be rotationally adjusted along the first axis accordingly. This may not be possible with prior art systems in which telescopic means have a physical lower limit and as such may not access a lower portion of a vessel. As such, the described separator may function over a wide range of operating conditions in which the ratio of fluids within well fluid varies significantly. For example, the described separator may operate efficiently during well testing, well clean-up, production and completion. Additionally the described separator may be fit for use across a greater range of well fluid flow rates than conventional separators.

The positioner may comprise a rotary actuator for rotating the collection pipe within the vessel. The rotary actuator may impart rotation motion of the collection to adjust a height of the opening within the vessel.

The separator may further comprise a coupling for translating rotary motion to the collection pipe.

The coupling may include at least one connecting shaft connected to the actuator to translate the rotary motion to the collection pipe.

The separator may further comprise a seal for sealing the positioner to prevent well fluid from flowing into the positioner. The seal may seal portions of the coupling and/or shaft. The seal may seal the vessel of the separator such that well fluid does not escape the vessel.

The seal may comprise a stuffing box. The stuffing box may be configured to sustain pressures and/or temperatures present in the vessel and well fluid within the vessel.

The positioner may be located at least partially external to the vessel. The rotary actuator may be located at least partially external to the vessel. This may be permit actuation of the rotary actuator and a rotational adjustment of a height of the opening through external control of the rotary actuator. This may remove the rotary actuator from the harsh temperatures and/or pressures present in the vessel of the separator. This may improve the robustness of the described separator.

The collection pipe may be configured such that, in use, a mass flow rate of a first fluid constituent through the collection pipe is substantially uniform or constant. This may reduce residence or retention time of a first and/or second fluid constituent within the vessel.

The collection pipe may have a generally constant cross-sectional area. This may reduce residence or retention time of a first and/or second fluid constituent within the vessel.

The separator may further comprise piping for receiving a first fluid constituent for removal from the vessel, the piping fluidly connected to the collection pipe. As the collection pipe is rotated the piping may rotate as well. The piping profile may be configured to remain generally constant during rotate of the fluid collection. The flow profile of the a first fluid constituent flowing through the piping may remain generally constant during adjustment of a height of the opening. A first fluid constituent may have a smooth flow rate through the piping while a height of the opening is adjusted. Furthermore, back pressure through the piping may not significantly affect a flow rate of a first fluid constituent.

A cross-sectional area of the piping and/or the collection may be substantially uniform.

The piping may comprise a tee type pipe fitting. The tee type pipe fitting may be rotated when the positioner rotationally adjusts a height of the opening. The piping may alternatively or additionally include other pipe fitting such an elbow fitting.

The separator may further comprise a support for supporting the collection pipe. The support may be configured to support the collection pipe within the vessel.

The support may be configured to support the collection pipe such that a first fluid constituent is removable from the vessel via fluid flow through the collection pipe at every rotational position of the collection pipe within the vessel.

The support may support the collection pipe such that the collection pipe may not define an angle at any rotational position of the collection pipe which would not permit fluid flow from the vessel through the opening. Rotational adjustment of a height of the opening may increase the angle.

The separator may comprise multiple collection pipes and multiple positioners. Each positioner may be connected to a collection pipe. Each positioner may be adapted to rotate a collection pipe to adjust a height of the opening of the respective collection pipe to an interface region between to constituents of well fluid within the separator. In this way various collection pipe may be used to collect various fluid constituents of the well fluid having different densities and accordingly different interface regions.

The collection pipe may comprise telescoping members such that the members slide out of each other to increase the length of the collection pipe, and slide into each other to decrease the length of the collection pipe. Increasing or decreasing the length of the collection pipe may adjust a height of the opening of the collection pipe within well fluid in the vessel.

The separator may further comprise a controller for controlling operation of the positioner based on the detected parameter. The controller may comprise one or more processors and computer-readable medium. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The controller may control telescopic movement of the telescoping members of the collection pipe.

The controller may be configured to control operation of an outlet valve for controlling flow of fluid from the vessel. The outlet valve may be operable to control flow of a first fluid constituent from the collection pipe.

The detected parameter may comprise at least one of an overall fluid level in the vessel, and an interface region between a first fluid constituent and a second fluid constituent in the vessel. The interface region may be defined as the approximate fluid interface between a first and a second fluid constituents. The interface region may be an interface level between a first and second fluid constituents. The interface level may be a vertical level or height within the vessel.

The separator may further comprise at least one detector for detecting the parameter of a first and/or a second fluid constituent in the vessel. Two detectors may be used to detect the parameter. A first detector may detect the parameter, and a second detector may verify the detected parameter or average the parameter detected by the first detector. A first detector may detect one parameter and a second detector may detect a different parameter.

At least one detector may be configured to detect an overall fluid level in the vessel.

The at least one detector may be configured to detect an interface region between a first and a second fluid constituent in the vessel. A first detector may be configured to detect the overall fluid level and a second different detector may be configured to detect the interface region. The interface region may be defined as the approximate fluid interface between a first and a second fluid constituent. The interface region may be an interface level or height between a first and a second fluid constituent. The interface level may be a vertical level or height within the vessel The at least one detector may comprise at least one guided wave radar detector.

A second fluid constituent may be water. A first fluid constituent may be oil. The oil may overlay the water within the vessel. In other words, the oil may be above the water within the vessel, and the water may be below the oil within the vessel.

The well fluid may be produced by the well. The well fluid may comprise oil, water, gas, solid particulate including sand and/or drilling mud. Well fluid may additionally or alternatively comprise drilling fluid or drilling mud, naturally occurring fluid, fluids added prior to separation, chemicals additives, proppant, and/or stimulation fluid or acid, and combinations thereof.

According to another aspect a method for separating constituents of well fluid in a separator is provided.

The method may provide one or more of the benefits described in respect of the separator.

The separator may comprise a vessel for receiving well fluid such that a first fluid constituent overlies the second fluid constituent within the vessel, and a collection pipe having an opening for collecting a first fluid constituent from the vessel. The collection pipe may collect the first fluid constituent for removal from the vessel.

The method may comprise rotating the collection pipe about an axis to adjust a height of the opening within well fluid in the vessel based on a detected parameter of well fluid so as to enable removal of a first fluid constituent.

Rotating may comprise actuating a rotary actuator for rotating the collection pipe to adjust a height of the fluid connector. The rotary actuator may be at least partially external to the vessel. Positioning the rotary actuator external to the vessel may protect the rotary actuator from the harsh internal environment of the vessel which may provide a more robust method for separating constituents of well fluid in a separator.

Rotating may comprise translating rotary motion to the collection pipe via a coupling. Translating may comprise translating the rotary motion through a seal in the vessel of the separator. The seal may comprise a stuffing box. The stuffing box may allow for the actuator to be external to the vessel which protects the actuator from the harsh environment within or internal to the vessel. Translating may comprise rotating an connecting shaft connected to the actuator. The connecting shaft may connect to the actuator on one end and connect to the fluid connector on the other end. The connecting shaft may connect to piping fluidly connected to the collection pipe.

The method may further comprise controlling flow of fluid from the vessel. Flow of fluid may be controlled based on the detected parameter. Controlling flow of fluid may comprise controlling flow of a first fluid constituent from the collection pipe. Controlling flow of fluid may comprise controlling operation of one of or more valves, for example and outlet valve fluidly connected to the collection pipe.

Controlling may comprise controlling flow of a first fluid constituent from the vessel via the collection pipe.

The method may further comprise detecting the parameter of first fluid constituent and/or second fluid constituent. Detecting the parameter may comprise detecting the parameter with one or more detectors. The detector may comprise a guided wave radar detector.

The detected parameter may comprise at least one of an overall fluid level in the vessel, and an interface region between a first fluid constituent and a second fluid constituent in the vessel. The interface region may be defined as the approximate fluid interface between a first and second fluid constituent. The interface region may be an interface level between a first and second fluid constituents. The interface level may be a vertical level or height within the vessel.

The method may further comprise receiving a first fluid constituent at the opening of the collection pipe for removal from the vessel. The collection pipe may collect the first fluid constituent for removal from the vessel.

A first fluid constituent may be oil. A second fluid constituent may be water. The oil may overlay the water within the vessel. In other words, the oil may be above the water within the vessel, and the water may be below the below the oil within the vessel.

The actuator may be a rotary actuator. The rotary actuator may be at least partially external to a vessel of the separator.

The described methods may provide one or more of the benefits described in respect of the separator.

According to another aspect a system for removing a first fluid constituent from a separator for separating constituents of well fluid produced by a well, the separator comprising a vessel for receiving well fluid such that a first fluid constituent overlies a second fluid constituent within the vessel.

The described system may provide one or more of the benefits described in respect of the separator and/or methods.

The system may comprise a collection pipe having an opening for collecting a first fluid constituent from the vessel. The collection pipe may collect the first fluid constituent for removal from the vessel.

The system may further comprise a positioner connected to collection pipe for rotating the collection pipe about an axis to adjust a height of the opening within well fluid in the vessel based on a detected parameter of well fluid so as to enable removal of a first fluid constituent.

The axis may be about the positioner. The axis may be perpendicular to the positioner.

The collection pipe may rotate about an axis of rotation. The axis of rotation may be defined by the positioner. The positioner may define a center or point of rotation of the axis of rotation. Thus, the collection pipe may rotate about the positioner. The collection pipe may rotate such that the longitudinal axis of the collection pipe rotates about the transverse axis of the positioner. Rotation of the collection pipe adjusts a height of the opening within well fluid in the vessel.

The positioner may define a rotation mechanism. Rotation of one or more parts of the positioner may cause rotation of the collection pipe.

The described separator may be a vertical, horizontal or spherical separator.

The described separator may be used in oil and/or gas production and/or retrieval. The separator may be used in other industries where fluid separation is accomplished by gravity.

The well may be an appraisal well, an off-shore well or an on-shore well. The well fluid may comprise oil, gas, water, solid particulates, drilling mud, stimulation fluid, etc.

The described controlling may be performed by a controller. The controller may comprise one or more processors and computer-readable medium. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

According to another aspect, there is provided a computer-readable medium comprising instructions that, when executed by a processor, perform any of the described methods.

The computer-readable medium may be non-transitory. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The processor may have a single-core processor or multiple core processors composed of a variety of materials, such as silicon, polysilicon, high-K dielectric, copper, and so on.

BRIEF DESCRIPTION OF THE DRAWINGS

A description is now given, by way of example only, with reference to the accompanying drawings, in which.

DETAILED DESCRIPTION OF THE INVENTION

Figure 1:
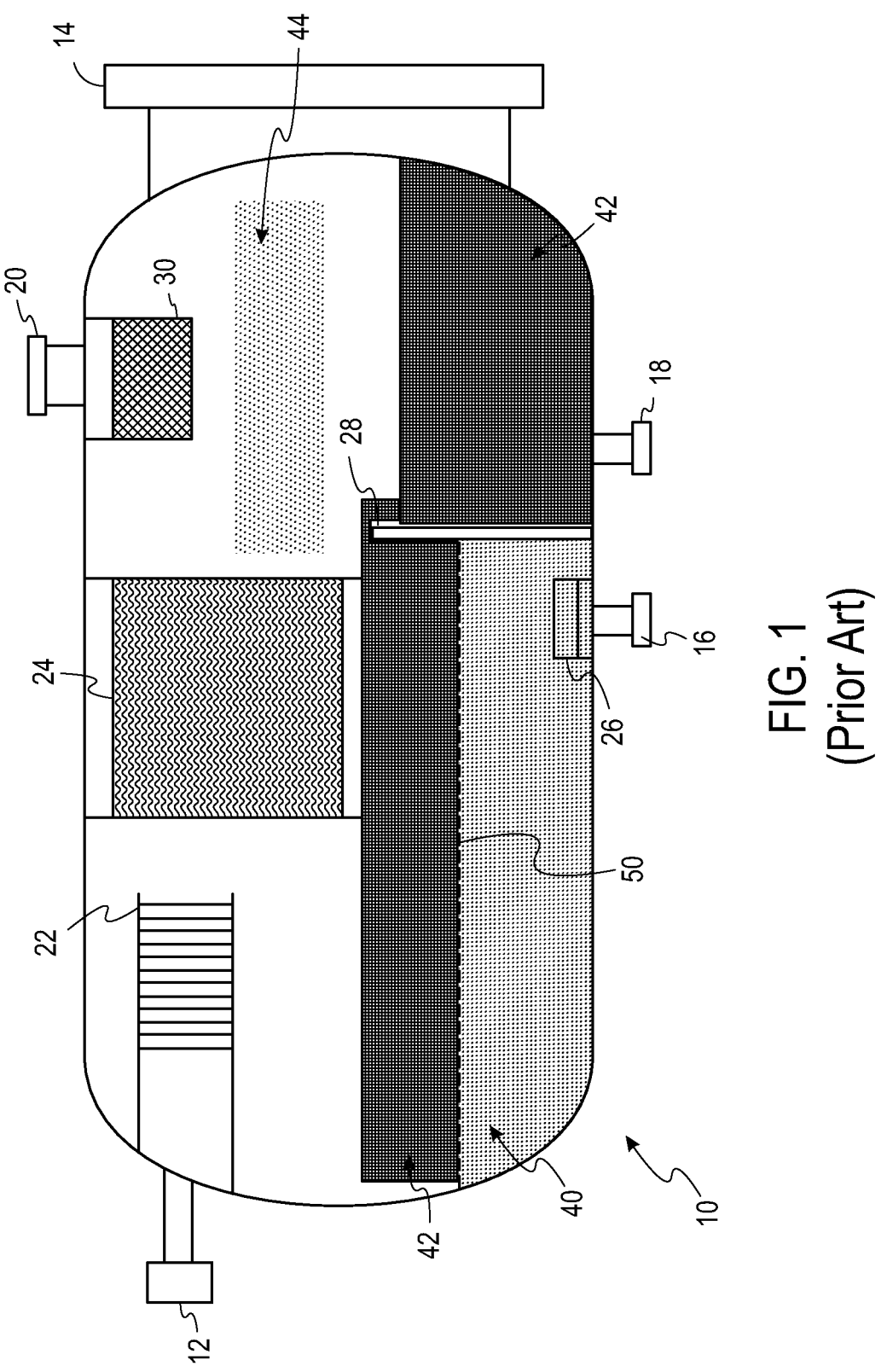
FIG. 1 is a diagram of a prior art separator.

Turning now to FIG. 1, an example of a known separator 10 is shown. The separator 10 is for separating components of well fluid produced from a well. The components may be in liquid, gas and/or solid form. Generally, the separator 10 comprises a pressure vessel having a fluid inlet through which well fluid produced by a well enters the separators. Components of the well fluid are separated and then exit the separator 10 via various outlets as will be described. In the illustrated arrangement, the pressure vessel is generally horizontally oriented. Furthermore, the pressure vessel is generally cylindrical with dished ends. Gravity segregation is the main force that accomplishes the separation, which means the components stratify in accordance with their density, with lighter or less dense fluids settling above heavier or more dense fluids. As such, the separator 10 may be defined as a gravity separator.

In the illustrated arrangement, the separator 10 comprises multiple components within the pressure vessel, such as inlet diverter plates 22, coalescing plates 24, a vortex breaker 26, a weir barrier 28 and a mist extractor 30. These components function to separate fluid components of the well fluid which is fed into the separator 10 via an inlet 12 as will be described. The inlet 12 is located on one side of the separator 10 proximate the inlet diverter plates 22.

When a multiphase well fluid comprising water, oil and gas is treated in the separator 10, water 40 is separated from the well fluid and expelled via a water outlet 16, oil 42 is separated from the well fluid and expelled via an oil outlet 18, and gas is separated from the well fluid and expelled via a gas outlet 20. The pressure vessel has an access door 14 for accessing these and other components for maintenance and/or inspection.

In the illustrated arrangement, the water outlet 16 and oil outlet 18 are located at the bottom of the pressure vessel on either side of the weir barrier 28. The gas outlet 20 is located at the top of the pressure vessel as gas is a lighter fluid than oil 42 or water 40 and thus rises to the top of the pressure vessel. The access door 14 is located on one side of the pressure vessel, the side being generally opposite the location of the inlet 12.

The inlet diverter plates 22 provide initial gross separation of components by changing the flow directions of the incoming well fluid. The coalescent plates 24 reduce foaming at the gas and liquid interfaces by liberating gas bubbles from the oil. The vortex breaker 26 prevents vortices which may form due to Coriolis forces during fluid outflow. Vortices may drag or entrain oil or solid particulate into fluid flowing into a liquid outlet thereby reducing separation efficiency and/or efficacy. In the illustrated arrangement, the vortex breaker 26 prevents vortices at the water outlet 16. The mist extractor 30 collects small liquid drops from the separated gas before the gas flows through the gas outlet 20. The weir barrier 28 is a physical barrier that separates the oil 42 and water 40 of the well fluid. The separator 10 may further include meters, valves and/or one or more controllers for measuring parameters and/or controlling components of the separator 10.

In use, well fluid produced by a well is introduced into the separator 10 via the inlet 12. The diverter or deflector plates 22 generally separate the liquid and gas components of the well fluid. While multiple plates 22 are pictured, a single plate may be used. The plates 22 cause a rapid change in direction and/or velocity of the introduced well fluid to separate the liquid and gas components of the well fluid.

The coalescent plates 24 liberate the gas bubbles. The gas flows towards the gas outlet 20 and liquid drops are collected by the mist extractor 30 before the gas flows through the gas outlet 20.

The oil 42 and water 40 of the well fluid sink to the lower region of the pressure vessel of the separator 10. The oil 42 and water 40 naturally separate and an interface between the oil 42 and water 40 is formed. As water 40 is heavier than oil 42, the oil 42 sits on top of the water 40 within the pressure vessel, i.e. the water 40 is below the oil 42 with respect to the interface. Water 40 exits the separator via the water outlet 16 and the vortex breaker 26 prevents vortices from forming at the water outlet 16. The height of the weir barrier 28 is such that the stratified oil component 42 weirs over the weir barrier 28, providing physical separation between the oil 42 and water 40, with the oil 42 then exiting the pressure vessel via the oil outlet 18. The various fluid outlets 16, 18 and 20 may be connected to pumps, compressors and/or tanks for drawing the separated fluids from the separator 10 and storing the separated fluids, respectively.

The described separator 10 is a three-phase separator as oil 42, gas and water 40 are separated from the well fluid. However, solids may also be present, which may also be removed using known techniques such that the separator 10 is a four-phase separator as oil 42, gas 44, water 40 and solids are separated from the well fluid. Additives can be added to encourage flocculation, coalescence etc.

As previously stated, the weir barrier 28 is a physical barrier that separates the oil 42 and water 40 of the well fluid. Since the water 40 and oil 42 have different densities, gravity allows primary separation of the water 40 and oil 42 to occur inside the separator 10.

The residence or retention time is a measure of the amount of time a liquid, e.g. water 40 or oil 42, is in the pressure vessel of the separator 10. The retention time is determined by dividing the liquid volume of the separator 10 by the flow rate of liquid into the separator 10. During the retention time, a liquid interface or level forms which is defined as the elevation within the separator 10 between the oil 42 and water 40. The liquid level defines an interface level 50 between the oil 42 and water 40.

The weir barrier 28 is configured relative to the interface level 50 such that oil 42 flows over the weir barrier 28 to exit the pressure vessel via the oil outlet 28 while water 40 does not flow over the weir barrier 28 and instead exits the pressure vessel via the water outlet 16.

The weir barrier 28 is fixed and thus, as illustrated in FIG. 1, the weir barrier 28 may not be sized or positioned optimally relative to the interface level 50. Depending on the flow rate of fluid flowing into the separator 10 the weir barrier 28 may not be sized/positioned relative to the interface level 50. Accordingly, separation of the oil 42 and water 40 may be inefficient. Furthermore, the retention time of the oil 42 and/or water 40 may be non-optimized. For example, the retention time of the water 40 may be too low which may not allow for formation of the interface between the water 40 and oil 42 at the interface level 50, and therefore not allowing for efficient separation.

In addition, additional time may be required to separate components of well fluid by the separator 10 which may increase well clean up and/or well testing times. The environmental risk presented by unseparated fluid is also increased. For example, oil 42 may exit the separator via the water outlet 16 presenting an environmental risk and/or increase costs.

Figure 2:
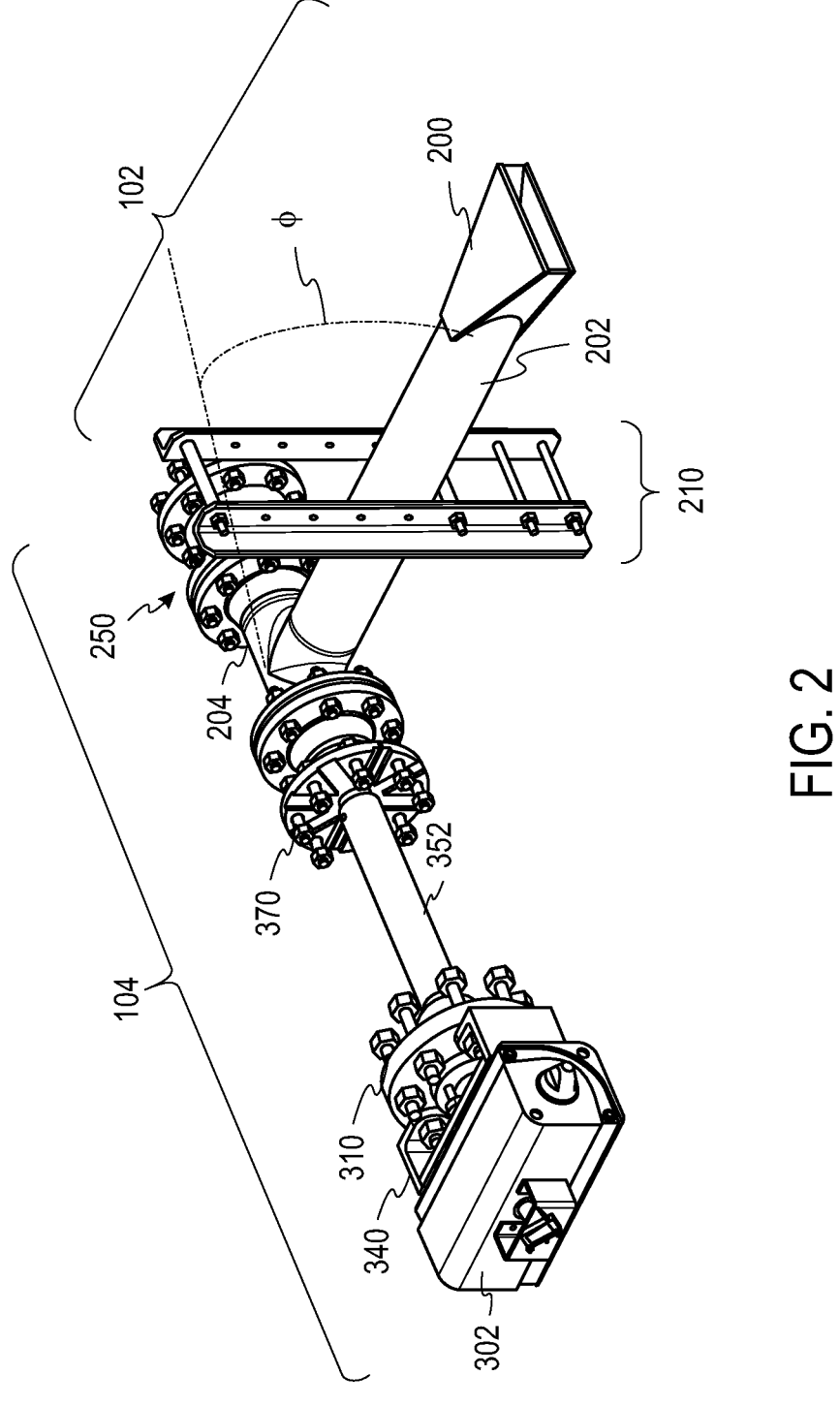
FIG. 2 is an isometric view of a system for removing fluid from a separator in accordance with an aspect of the disclosure.

Turning now to FIG. 2, a system 100 for removing fluid from a separator is illustrated. The system 100 is illustrated in FIGS. 2-7 in a variety of views to illustrate all components comprised therein. The following description is provided in reference to FIGS. 2-7.

The system 100 is configured for use within a separator, such as the separator 10 illustrated in FIG. 1 replacing the weir barrier 28 illustrated in FIG. 1. The system 100 allows for rotation of a collection pipe relative to a positioner to adjust a height of an opening in the collection pipe for collecting a first fluid constituent from a vessel of the separator. The collection pipe may collect the first fluid constituent for removal from a separator vessel via the opening. The first fluid constituent, e.g. oil, sits on top of a second fluid constituent, e.g. water, within the vessel, i.e. the second fluid underlies the first fluid constituent in the vessel. The system 100 optimizes the retention or residence time of fluids within the vessel, e.g. oil, water, by adjusting the maximum volume of fluid which may be retained in the vessel at any given point in time thereby increasing efficiency, as will be described below. Furthermore, the rotational operation of the system 100 which will be described provides robust fluid removal from the vessel of the separator 100 improving performance and reducing the risk of detrimental environmental exposure. In the illustrated arrangement, the vessel is a horizontal pressure vessel, although one of skill in the art will appreciate that the vessel may be vertical or spherical.

The system 100 comprises a collection pipe 102 and a positioner 104. The collection pipe 102 is for receiving a first fluid constituent for removal from a vessel of a separator. The vessel is for receiving well fluid such that a first fluid constituent overlies a second fluid constituent within the vessel. The positioner 104 is for rotating the collection pipe 102 to adjust a height of the opening of the collection pipe 102 within well fluid in the vessel. The positioner 104 may rotate the collection pipe 102 to adjust the height of the opening based on a detected parameter of well fluid so as to enable removal of a first fluid constituent as will be described.

The collection pipe 102 comprises an opening fluidly connected to piping to collect and remove fluid from the vessel. In the illustrated arrangement, the opening takes the forms of an intake 200. Further in the illustrated arrangement, the piping comprises an intake pipe 202 is fluidly connected to a tee pipe fitting 204. The piping further comprises exit pipe 206 fluidly connected to the tee pipe fitting 204.

In the illustrated arrangement, the intake 200 has a generally trapezoidal shape, i.e., the shape of a trapezoid or trapezium. The cross-sectional area is substantially uniform through the length of the intake 200. In other words, the internal cross-sectional area of the intake 200 is substantially uniform along a length of the intake 200, or along a flow path of a fluid flowing through the intake 200. During use the mass flow rate of fluid flowing through the intake 200 is substantially uniform.

The intake pipe 202 is generally longitudinal. The tee pipe fitting 204 is generally T-shaped. The exit pipe 206 is generally longitudinal. In the illustrated arrangement the intake pipe 202 is fluidly connected to one end of the tee pipe fitting 204, and the exit pipe 206 is fluidly connected to another perpendicular end of the tee pipe fitting 204.

The tee pipe fitting 204 has three fluid connection ends. On one end, the tee pipe fitting 204 is fluidly connected to the collection pipe 102. Another end of the tee pipe fitting 204 is fluidly connected to the exit pipe 206. On the final end, the tee pipe fitting 204 is fluidly connected to a stub 220. The tee pipe fitting 204 is connected to the intake pipe 202, and stub 220 via any suitable connection means. For example, the tee pipe fitting 204 may be welded or connected via nuts and bolts to one or more of the intake pipe 202, and stub 220. The intake pipe 202 is welded to the connector, but other connection mechanisms are possible. While a tee pipe fitting 204 has been described, one of skill in the art will appreciate that another form of pipe fitting may be used.

The tee pipe fitting 204 is connected to the exit pipe 206 via swivel connection such that upon rotation of the intake pipe 202, the exit pipe 206 does not rotate as will be described. The exit pipe 206 allows rotation of the tee pipe fitting 204 and the intake pipe 202.

In use, fluid flows in through the intake 200, through the intake pipe 202, tee pipe fitting 204 and exit pipe 206. The height of the intake 200 of the collection pipe 102 may be adjusted based on detected parameters associated with well fluid in the vessel of the separator as will be described. The parameters may be associated with: the well fluid prior to introduction into the vessel of the separator, the well fluid after introduction into the vessel, and/or fluid constituents of the well fluid. Specifically, the position or height of the intake 200 within the vessel is adjusted to an interface region of the first and second fluids so that the first fluid, e.g. oil, is removed from the separator via the intake pipe 202, tee pipe fitting 204 and exit pipe 206.

As illustrated in at least FIG. 2, the intake 200 and intake pipe 202 are supported by a support 210. The support 210 is configured to support the intake 200 and intake pipe 202 such that the first fluid is removed via the intake 200 at any position of the intake 200. As such, the support 210 does not allow the intake pipe 202 to have a negative angle relative to the tee pipe fitting 204 such that flow is not achievable from the separator without a pressure source.

In the illustrated arrangement, the support 210 comprises first and second support rails 212, 214 and spacer members, such as tubes 216. The support rails 212, 214 are spaced parallel rails. The support rails 212, 214 are each generally L-shaped. The spacer tubes 216 are secured between the rails 212, 214. In the illustrated arrangement, the spacer tubes 216 are bolted to opposite apertures 218 in the rails 212, 214. While four spacer tubes 216 are illustrated, more or fewer may be present. The intake pipe 202 is supported by a spacer tube 216. This supporting spacer tube 216 may accordingly define the minimum or lowermost rotational position of the collection pipe 102 and accordingly the intake 200. Another spacer tube 216 may define the maximum or uppermost rotational position of the collection pipe 102 and intake 200 by defining a stop against which the intake pipe 202 abuts upon maximum rotation. In this manner, a spacer tube 216 may ensure the intake pipe 202 does not rotate past a predefined maximum rotation angle, e.g. a vertical orientation or approximately 90 degree rotation angle. The spacer tubes 216 define the range of rotation of the collection pipe 102. As illustrated in FIG. 2, the range of rotation is indicated as rotation angle φ. The intake pipe 202 passes through an opening between spacer tubes 216 to fluidly connect to the tee pipe fitting 204.

The angle φ illustrates a first axis along which the collection pipe 102 is rotationally adjusted.

As previously stated, the tee pipe fitting 204 is connected to the stub 220. The stub 220 is for transferring rotational motion of the positioner 104 to the collection pipe 102. The stub 220 comprises a stub shaft 224 extending from an end plate 222. The end plate 222 is a circular member having circumferentially spaced apertures at a periphery thereof. The stub shaft 224 is an elongate shaft extending from a radial center of the end plate 222. The end plate 222 of the stub 220 is secured to the tee pipe fitting 204 via any suitable fastening means. In the illustrated arrangement bolts inserted in the apertures of the end plate 222 secure the end plate 222 to the tee pipe fitting 204 via nuts. A gasket 228 is positioned between the end plate 222 and the tee pipe fitting 204 to seal the connection therebetween.

The stub shaft 224 is circumferentially surrounded by a bushing 230 within an aperture of 376 of a flange 370 of the positioner 104. In the illustrated arrangement the flange 370 is a two-part machined flange. The bushing 230 provides an interface between the stub shaft 224 and the aperture 376 in the flange 370 of the positioner 104.

The stub shaft 224 comprises a guide aperture 226 sized to receive a pin 360 of the positioner 104 as will be described. The guide aperture 226 is centrally located in the stub shaft 224.

Figure 5:
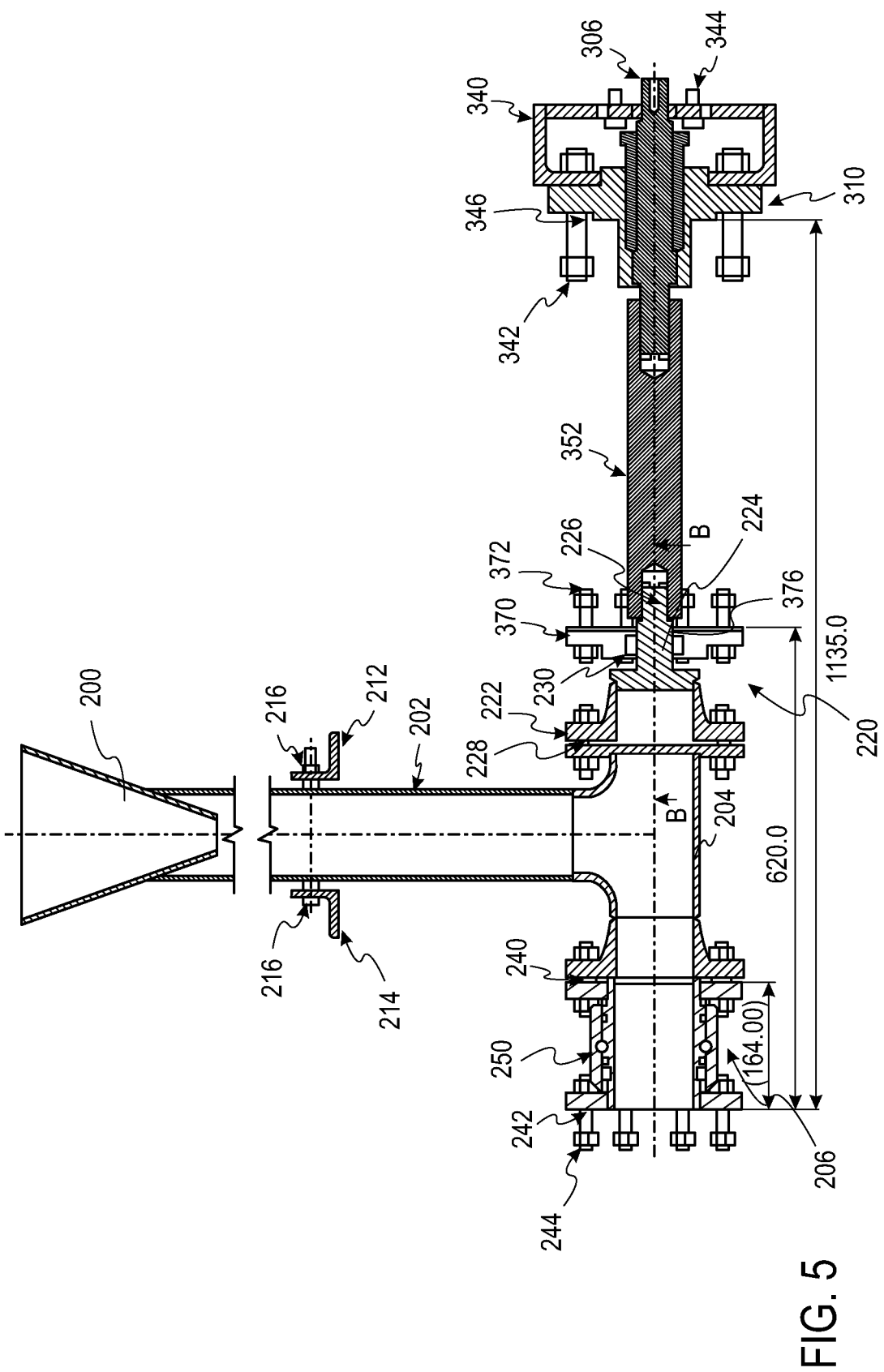
FIG. 5 is another cross-sectional plan view of the system.

As previously stated, the tee pipe fitting 204 is connected to the exit pipe 206. A gasket 240 is positioned between the tee pipe fitting 204 and the exit pipe 206 to seal the connection therebetween. As illustrated in FIG. 5 the exit pipe 206 may comprise one or more bolts 242 and nuts 244 to connect the exit pipe 206 to other pipe fittings. The exit pipe 206 receives the first fluid from the separator, which may be oil, for removal from the separator. As such the exit pipe 206 may be fluidly connected to one or more downstream valves, storage tanks, processing systems, or other piping.

The exit pipe 206 comprises a swivel 250. The swivel 250 is a packed swivel configured to permit rotational motion of tee pipe fitting 204 relative to the exit pipe 206. The swivel 250 ensures the exit pipe 206 does not rotate when the tee pipe fitting 204 rotates. In this manner, a fluid connection to the exit pipe 206, e.g. valve, collection tank, etc., is not affected by rotation of the tee pipe fitting 204.

As previously stated, the positioner 104 rotates the collection pipe 102 to adjust a height of the opening (intake 200) in well fluid in the vessel based on a detected parameter of well fluid. The positioner 104 comprises an actuator 302. The actuator 302 rotates at least a portion of the collection pipe 102 to a desired angle according to a detected parameter as will be described. The actuator 302 is a rotary actuator for rotating the collection pipe 102 to adjust a height of the intake 200 within well fluid in a vessel of a separator as will be described. In the illustrated arrangement the actuator 302 takes the form a box which fits over a drive shaft 306. The drive shaft 306 is a generally elongate member which rotates upon actuation of the actuator 302.

The actuator 302 is positioned outside the vessel of the separator. The drive shaft 306 passes through the wall of the vessel via a seal which in the illustrated arrangement comprises a stuffing box 310.

Figure 6:
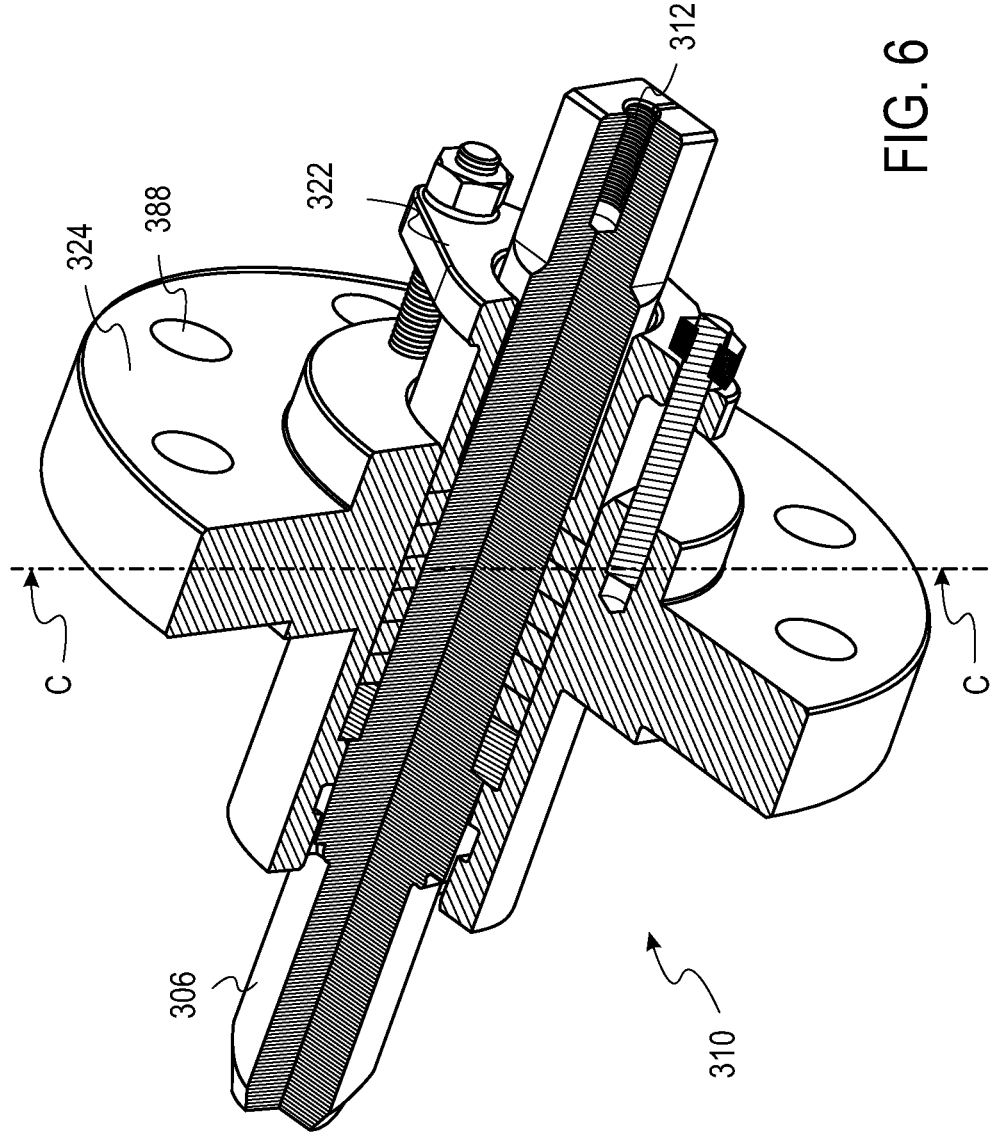
FIG. 6 is a cutaway view of a portion of the system.
Figure 7:
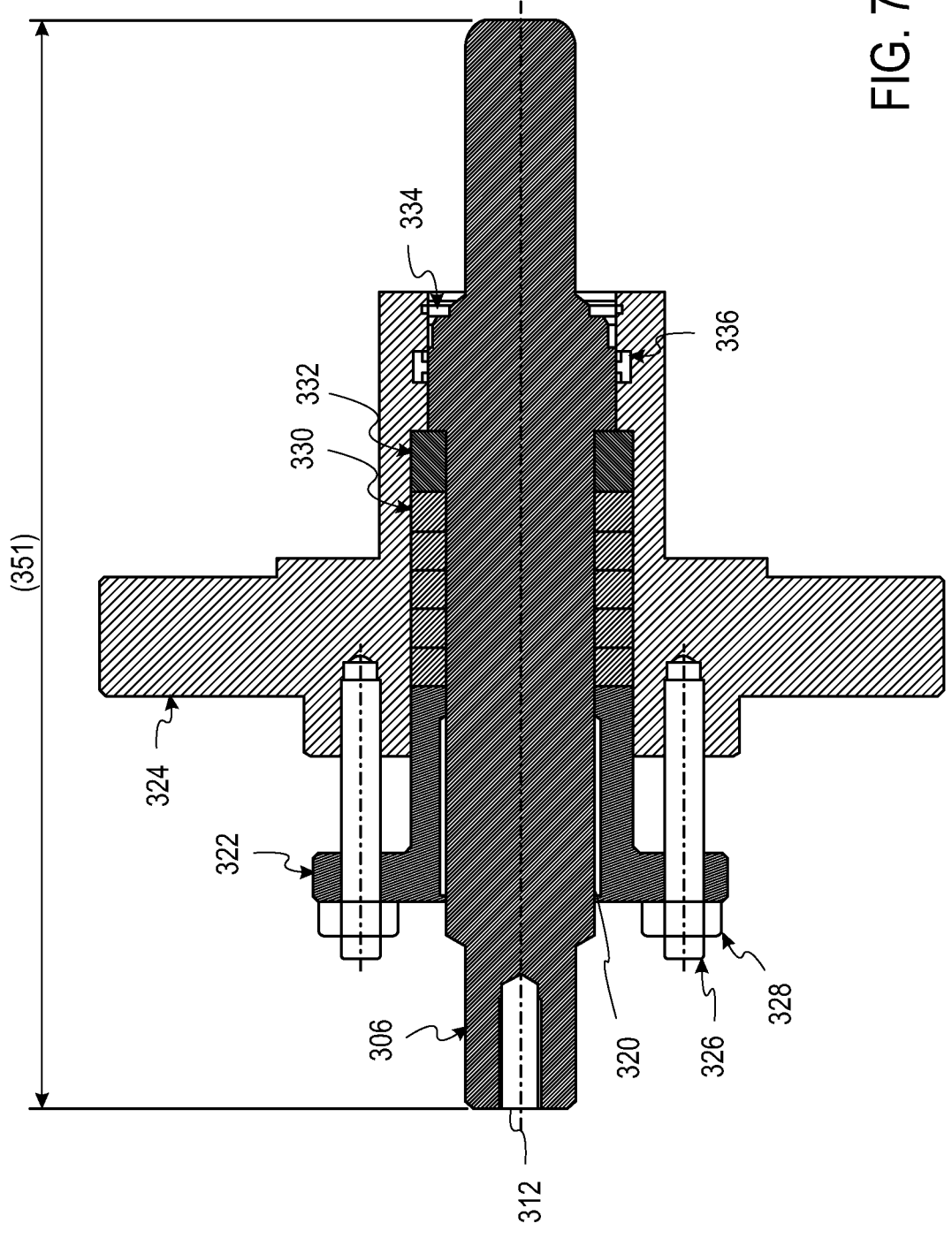
FIG. 7 is a cross-sectional elevation view of the portion of the system along sectional line C-C of FIG. 6.

The stuffing box 310 is illustrated in more detail in FIGS. 6 and 7. The stuffing box 310 is generally circular and is configured to withstand the pressure, temperature and general environmental conditions within the vessel of the separator. The stuffing box 310 ensures a fluid tight transference of the rotatory force provided by the actuator 302. In the illustrated arrangement, the drive shaft 306 passes through a central aperture 320 of the flange 324.

The stuffing box 310 comprises a gland 322 surrounding the drive shaft 306 secured to a flange 324 of the stuffing box 310 via two studs 326 secured by nuts 328. The gland 322 has a generally oval shape. The studs 326 pass through apertures in the gland 322 into the flange 324. The studs 326 are equidistant from a central axis of the gland 322. The force applied by the gland 322 on the flange 324 upon securing the gland 322 to the flange 324 via the studs 326 and nuts 328 compresses packing 330 within the central aperture 320. A bushing 332 proximate the packing 330 acts as a centralizer to keep the shaft 306 centralized when a rotating force is applied to the shaft 306. Retaining ring 334 and seal 336 are also present to provide a fluid tight seal.

An aperture 312 in the drive shaft 306 is sized to receive a bar for removal of the drive shaft 306 from the flange 324 if shaft 306 becomes stuck.

The stuffing box 310 is secured to the vessel external surface via any suitable securing means. For example, studs, nuts, bolts, etc. may secure the flange 324 of the stuffing box via apertures 338 spaced about the circumferential periphery of the flange 324. As illustrated in FIG. 5, the stuffing box 310 is secured to actuator mount 340 via the studs 342 through apertures 338. The actuator mount 340 provides a connection mount for the actuator 302. The actuator mount 340 comprises cap screws 344 for mounting of the actuator 302 in alignment with the drive shaft 306. In the illustrated arrangement, the stuffing box 310 further comprises a gasket 346 for further sealing the stuffing box 310.

Figure 3:
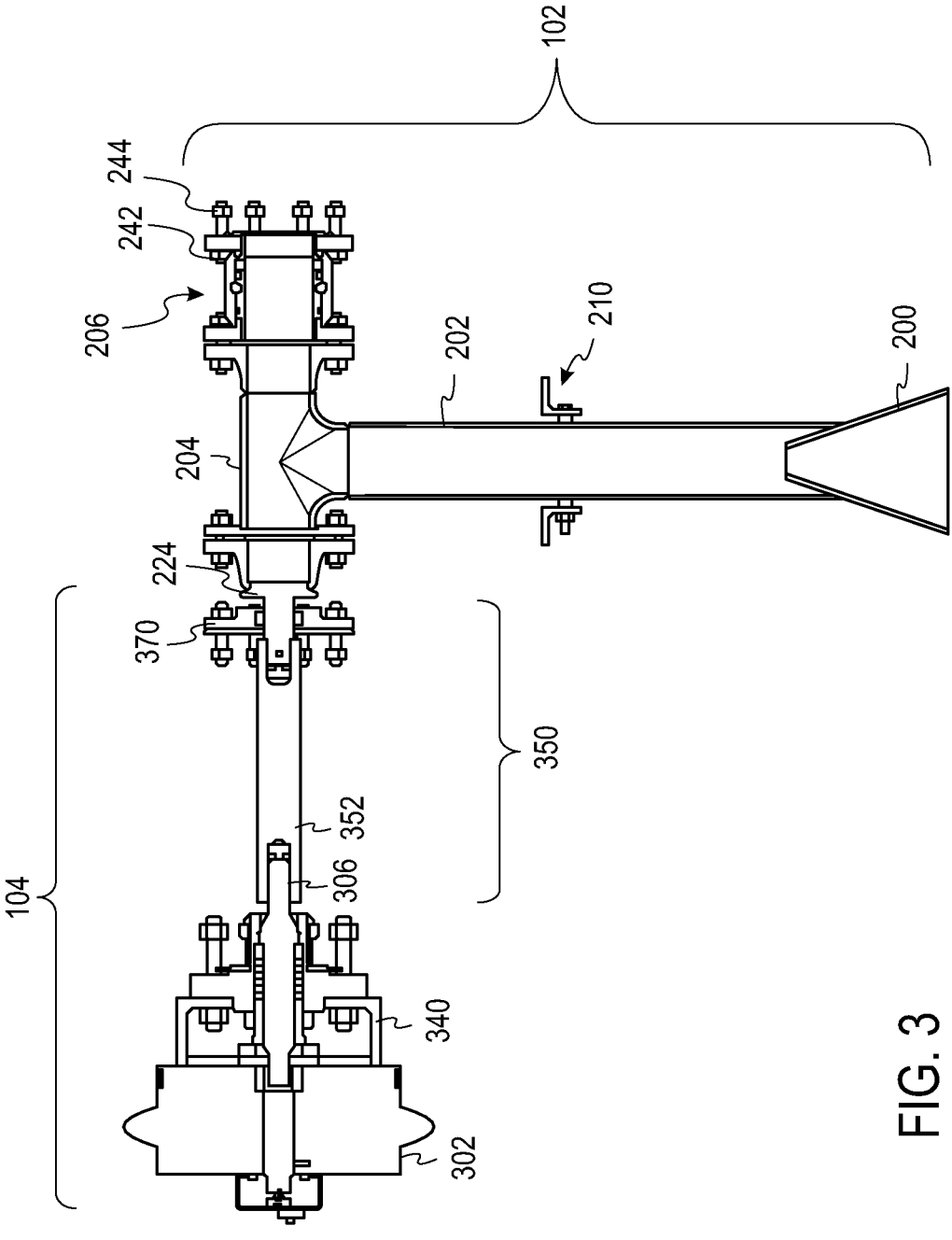
FIG. 3 is a cross-sectional plan view of the system.
Figure 4:
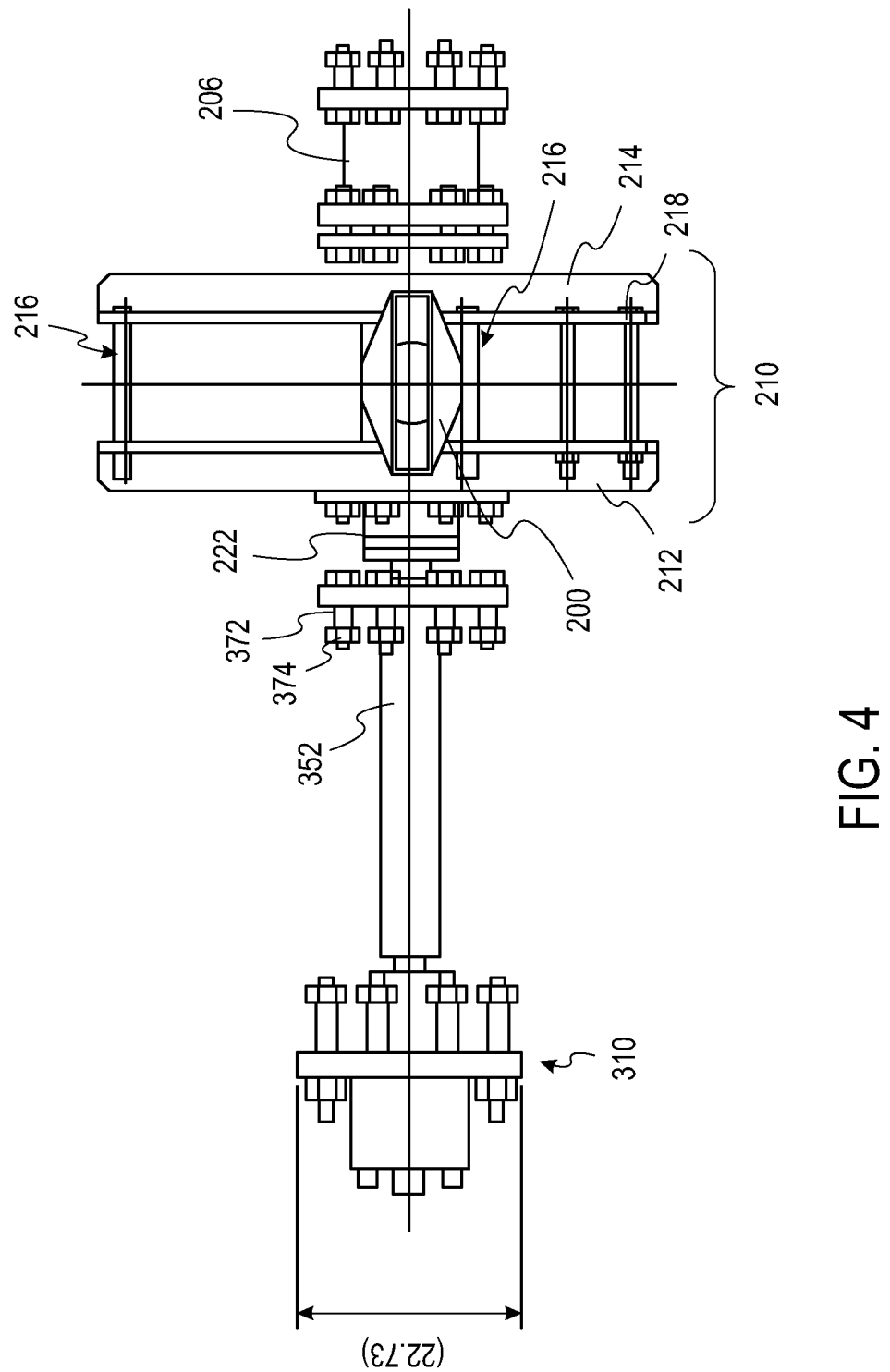
FIG. 4 is a front elevation view of the system.

As illustrated in FIG. 3, the drive shaft 306 is connected to a coupling 350. The coupling 350 translates the rotary motion of the drive shaft 306 to rotary motion of the collection pipe 102. The coupling 350 comprises a connecting shaft 352. The connecting shaft 352 interlocks with the drive shaft 306.

The coupling 350 further comprises the flange 370. The flange 370 is configured to provide support. The flange 370 may be connected to components within the vessel of the separator via bolts 372 and nuts 374. The bolts 372 pass through circumferential apertures at the periphery of the flange 370. The flange 370 may provide support for the positioner 104 by securing the positioner to a component within the vessel. The flange 370 is generally circular and has a central aperture 376 for receiving the stub shaft 224 of the collection pipe 102.

The coupling 350 further comprises a pin 360 which is inserted into the guide aperture 226 of stub shaft 224 the collection pipe 102. The pin 360 secures the stub shaft 224 of the collection pipe 102 to the connecting shaft 352 of the positioner 104 such that the collection pipe 102 rotates upon rotation of the shaft 352 via rotation of the drive shaft 306 of the positioner 104. The stub shaft 224 passes through the central aperture 376 of the flange 370 for connection to the shaft 352 by insertion of the pin 360 through apertures in the shaft 352 and the guide aperture 226 in the stub shaft 224. The pin 360 may be secured by any suitable securing means such as nuts.

The system 100 further comprises one or more detector 106 for detecting one or more parameters of well fluid. In the illustrated arrangement, the detector 106 is configured for detecting one or more parameters of a first and second fluid constituents. The system further comprises a controller 108 for controlling operation of the positioner 104 based on the detected parameter.

Figure 8:
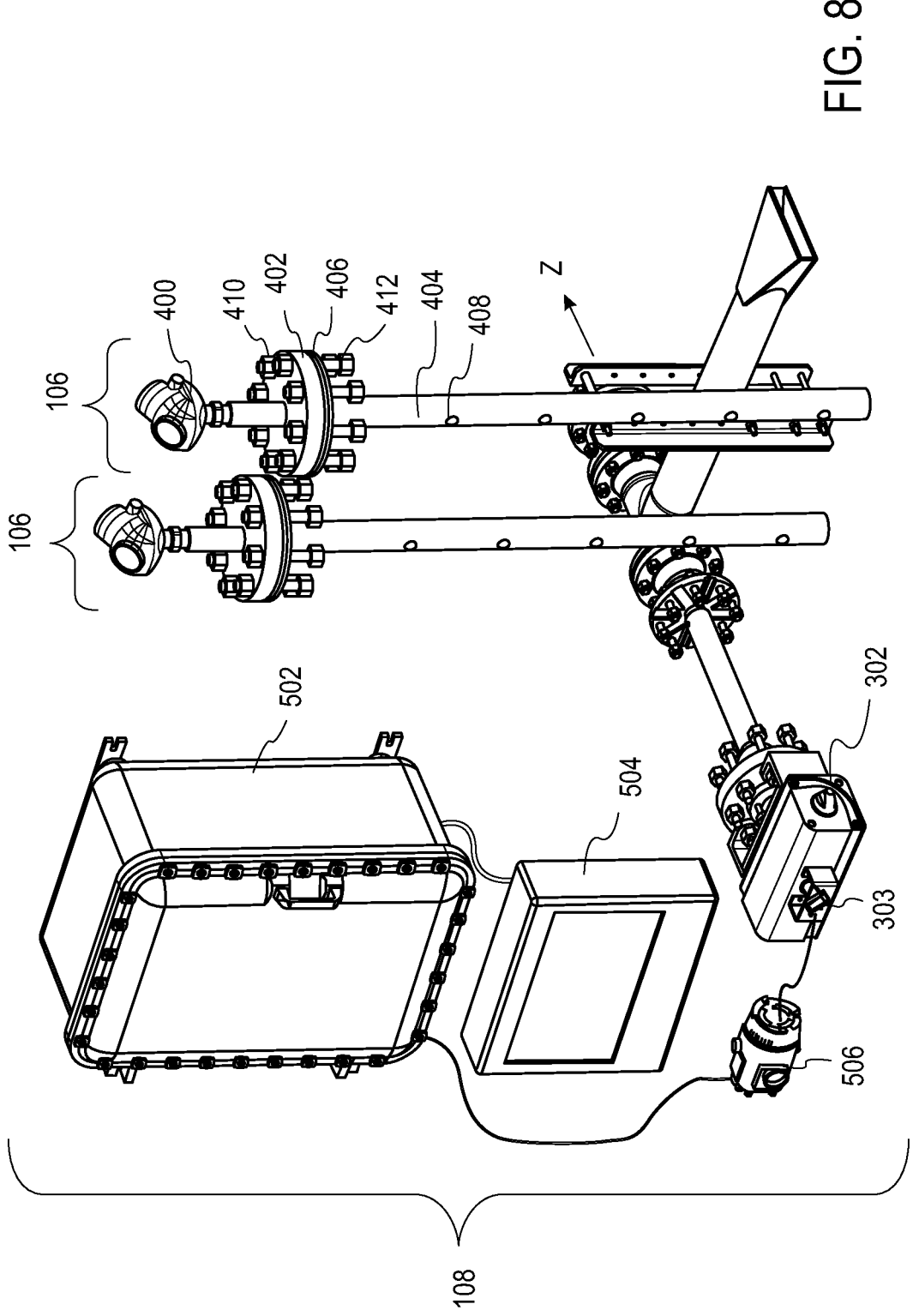
FIG. 8 is an isometric view of a system for removing fluid from a separator in accordance with an aspect of the disclosure

Turning now to FIG. 8, the system 100 is illustrated with detectors 106 and the controller 108. The position of the collection pipe 102 is rotated by the positioner 104 based on the detected parameters. While in the illustrated arrangement two detectors 106 are shown, one of skill in the art will appreciate that more or fewer detectors 106 may be used.

Each detector 106 comprises a level sensor. In the illustrated arrangement the level sensor takes the form of a guided wave radar detector 400 affixed on a guided wave radar flange 402 to a stilling well 404. The stilling well 404 comprises a plurality of apertures 408 along the height of the stilling well 404 to allow for fluid ingress/egress into the hollow interior of the stilling well 404. The stilling well 404 provides a clean target surface for the guided wave detector 400 to detect a parameter of a first and/or second fluid constituent. In this context, clean is defined as turbulence and/or foaming of the fluid in the stilling well 404 is reduced compared to outside of the stilling well 404 to allow for signal detection. The stilling well 404 is secured to the guided wave radar flange 402.

The guided wave radar flange 402 is secured to the stilling well 404 via any suitable fastening means. In the illustrated arrangement, a plurality of bolts 410 and associated nuts 412 secure the guided wave radar flange 402 to the stilling well 404. A gasket 406 seals the guided wave radar flange 402 to the stilling well 404 to prevent leaks.

The guided wave radar detector 400 comprises a probe which extends into the stilling well 404. The probe is configured to detect an interface region or level between first and second fluids in the separator. Alternatively or additionally, the probe is configured to detect a total height level of a first and second fluid constituents in the separator. Parameters detected by both of the guided wave radar detectors 400 may be averaged or used for verification.

The controller 108 is configured for controlling operation of the positioner 104 based on the parameter detected by the detectors 106. The controller 108 is configured to receive the parameter detected by the detectors 106 and control operation of the positioner 104 based at least in part on the received parameter. The controller 108 may perform analysis on the received parameters prior to controlling operation of the positioner 104. The controller 108 may receive additional inputs, e.g. separator operating condition such as pressure, flow rates, temperature. The controller 108 may include one or more additional inputs as part of the analysis in order to control operation of the positioner 104.

The controller 108 may also be configured to control operation of one or more control valves to control pressure within the separator and fluid rates into and out of the separator.

In the illustrated arrangement the controller 108 comprises a control panel 502, a human machine interface (HMI) 504, and a position controller/indicator 506. The control panel 502 is electrically connected to the HMI 504 and the position controller/indicator 506. The control panel 502 is additionally connected to one or more control valves controlling fluid flow into and out of the separator. The control panel 502 is further electrically connected to the detector 106. In the illustrated arrangement the control panel 502 receives parameters detected by the detectors 106 wirelessly while communication between the HMI 504 and position controller/indicator 506 are effected via wired connections. One of skill in the art will appreciate the wired connections may be wireless connections. Similarly, the described wireless communication may be effected through wired communication mechanisms.

The control panel 502 houses hardware and/or software logic, circuitry, components etc. for communicating with the position controller/indicator 506, and the HMI 504.

The position controller/indicator 506 is connected to the actuator 302. The position controller/indicator 506 controls actuation of the actuator 302 to control rotation of the 102 collection pipe 102. In the illustrated arrangement the position controller/indicator 506 is connected to a pin 303 extending from a bracket of the actuator 302. Alternatively the position controller/indicator 506 may be directly connected to the actuator 302.

The position controller/indicator 506 monitors the position of the actuator 302 thereby monitoring the rotation angle φ of the collection pipe 102.

The HMI 504 outputs position information collected from the position controller/indicator 506 communicated via the control panel 502. The HMI 504 may also allow for manual actuation of the actuator 302 via inputs from a user.

In use, the detectors 106 detect a fluid interface region or level between a first fluid constituent (oil) and second fluid constituent (water) underlying a first fluid constituent in the vessel. The detected level is received or collected by the controller 108. The controller 108 controls the positioner 104 based on the detected level. If the detected level is higher or lower than the position of the intake 200 within the separator, the controller 108 controls the positioner 104 to rotate the collection pipe 102 to adjust a height of the opening (intake 200). The position controller/indicator 302 controls the actuator 302 to rotate the drive shaft 306. The drive shaft 306 passes through the stuffing box 310 to rotate the connecting shaft 352 of the coupling 350. The shaft 352 rotates the stub shaft 224 via a connection with the pin 360. Rotation of stub shaft 224 in turn rotates the intake pipe 202 and tee pipe fitting 204 such that position, e.g. height, of the intake 200 is adjusted within the separator. The swivel 250 ensures the exit pipe 206 of the collection pipe 102 does not rotate. In this manner the intake 200 is always optimally positioned at the interface region or level between the two fluid constituents. This ensures optimal removal of a first fluid constituent from the vessel.

Optimally positioning the intake 200 at the interface region ensures the retention or residence time of the fluid constituents within the vessel is optimized, i.e. the time is not too short which does not allow for formation of the interface between the constituents, e.g. water 40 and oil 42, and the time is not too long which increases the time a fluid is in the separator thereby increasing separation time. Setting the intake 200 at a higher level may allow for the second fluid constituent, e.g. water, to have a longer retention or residence time, while lowering the intake 200 may allow the first fluid constituent, e.g. oil, to have a longer retention or residence time. Altering outlet flow rates may also change retention or residency times.

Furthermore, adjusting the level of the height of the intake 200 may change the water, oil and/or gas capacity of the separator. For example, setting the intake 200 at a higher level or elevating the intake 200 increases the water capacity of the separator. Lowering the intake 200 or setting the intake 200 at a lower level may increase the gas capacity of the separator. In this manner the level of the intake 200 may be set for a particular desired application and/or output.

During removal a first fluid constituent flows in the intake 200 through the intake pipe 202, tee pipe fitting 204 and exit pipe 206 out of the separator. A first fluid constituent may thereby quickly and safely removed from the separator in direction Z illustrated in FIG. 8.

Figure 9:
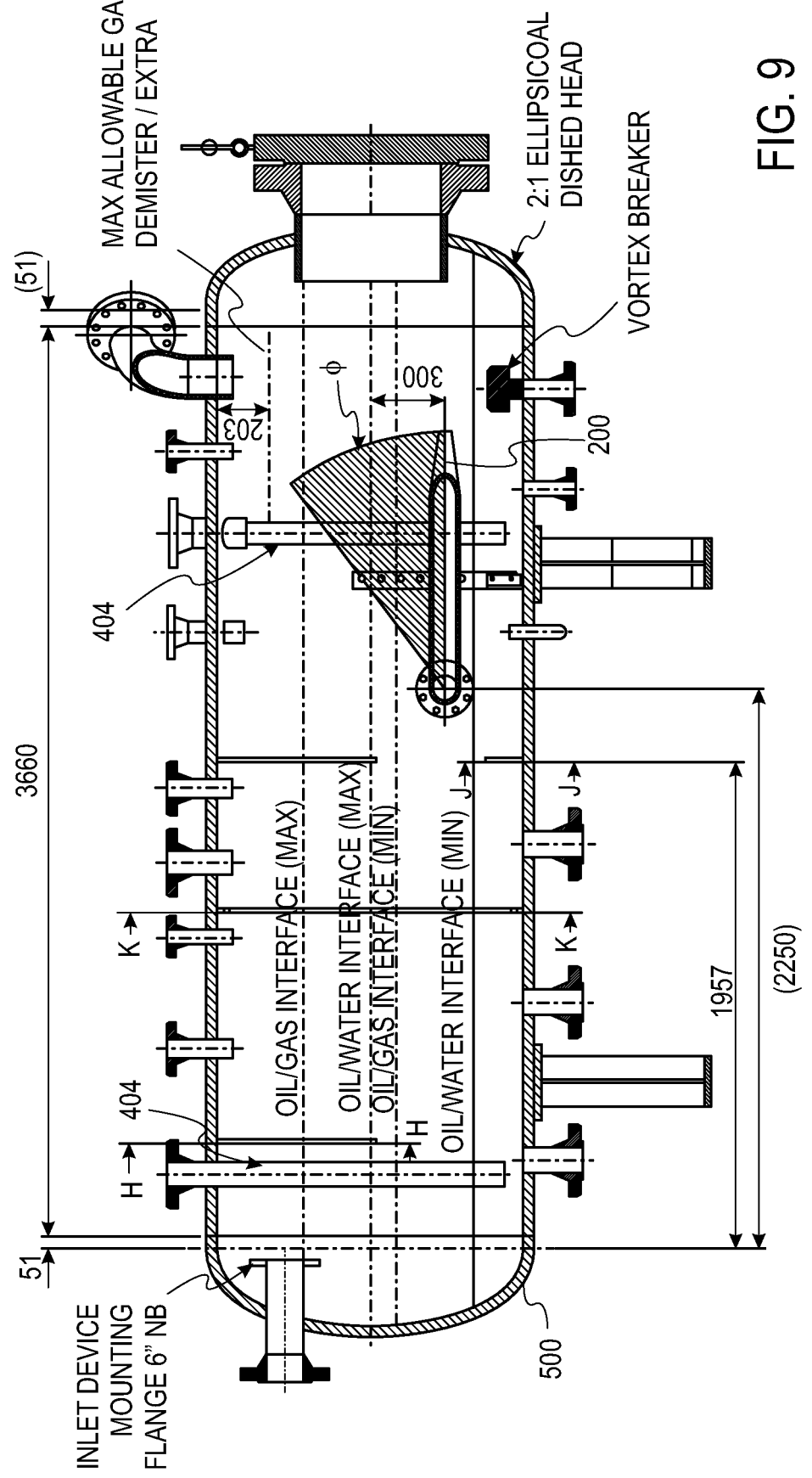
FIG. 9 is a cross-sectional view of a separator comprising a system in accordance with an aspect of the disclosure.

Turning now to FIG. 9, a separator 500 comprising the system 100 is illustrated. The separator 500 comprises a number of additional components such as a vortex breaker found in conventional separators. As illustrated in FIG. 9, the height of the intake 200 within the vessel of the separator 500 may be adjusted through rotation of the collection pipe 102 by rotation angle φ from a minimum interface level of a first and second fluid constituents to a maximum interface level of a first and second fluid constituents. The minimum, maximum and rotation angle φ may be preselected based on the application by adjusting dimensions and spacing of the spacer tubes 216 of the support 210. The dimensions and spacing may be set based on dimensions of the separator. The customization of the described angles allows for the described system 100 to be retrofit to an existing separator.

Figure 10:
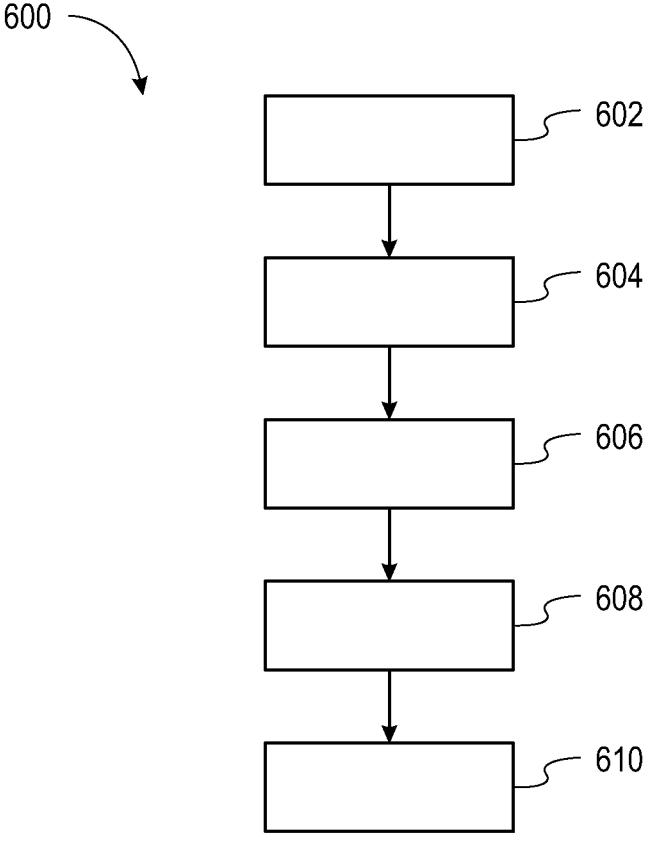
FIG. 10 is a flowchart of a method for removing fluid from a separator in accordance with an aspect of the disclosure.

Turning now to FIG. 10, a flowchart of a method 600 removing fluid from a separator is illustrated. The method 600 comprises actuating an actuator 302 to rotate the collection pipe 102 to adjust a height of the intake 200 within the vessel of the separator. Rotating comprises actuating 604 the actuator for rotating the collection pipe 102 to adjust a height of the intake 200. The method 600 further comprises translating 606 rotary motion to the collection pipe 102 via the coupling 350.

The method 600 further comprises detecting 602 the parameter of first fluid and/or second fluid prior to the rotating 604 step. Detecting 602 comprises detecting by the detectors 106 the interface region or level between a first and second fluid constituents.

The method 600 further comprises receiving 608 first fluid at the collection pipe 102 for removal from the separator. Receiving 608 comprises receiving first fluid constituent at the intake 200. The method further comprising removing 610 a first fluid constituent from the separator. Removing 610 comprises first fluid constituent flowing through the intake pipe 202, tee pipe fitting 204 and exit pipe 206 out of the separator.

It should be understand that arrangement or embodiments described herein are merely exemplary and that various modifications may be made thereto without departing from the scope of the disclosure as defined by the claims appended hereto.

The invention claimed is:

1. A separator for separating constituents of well fluid produced by a well, the separator comprising:
a vessel for receiving well fluid such that a first fluid constituent overlies a second fluid constituent within the vessel and an interface region is disposed at a fluid interface between the first fluid constituent and the second fluid constituent;
a collection pipe having an opening for collecting the first fluid constituent from the vessel; and
a positioner having a rotational axis and a rotary actuator controllable to rotate the positioner about the rotational axis;
wherein the collection pipe is connected to the positioner and extends outwardly from the rotational axis, such that rotating the positioner about its rotational axis changes a height of the opening within well fluid in the vessel; and
wherein the actuator is configured to rotate the positioner about the rotational axis such that the collection pipe has a positive angle relative to the positioner.

2. The separator of claim 1, further comprising a seal for sealing the positioner to prevent well fluid from flowing into the positioner.

3. The separator of claim 2, wherein the seal comprises a stuffing box.

4. The separator of claim 1, wherein the positioner is located at least partially external to the vessel.

5. The separator of claim 1, wherein the collection pipe is configured such that, in use, a mass flow rate of a first fluid constituent through the collection pipe is substantially uniform.

6. The separator of claim 1, wherein the collection pipe has a generally constant cross-sectional area.

7. The separator of claim 1, further comprising piping for receiving a first fluid constituent for removal from the separator, the piping fluidly connected to the collection pipe.

8. The separator of claim 1, further comprising a controller for controlling operation of the positioner based on a detected parameter.

9. The separator of claim 8, wherein the controller is configured to control operation of an outlet valve for controlling flow of fluid from the vessel.

10. The separator of claim 9, wherein the outlet valve is configured for controlling flow of a first fluid constituent from the collection pipe.

11. The separator of claim 10, wherein the detected parameter comprises at least one of an overall fluid level in the vessel, and the interface region between a first fluid constituent and a second fluid constituent in the vessel.

12. The separator of claim 11, further comprising at least one detector for detecting the parameter of a first fluid constituent and/or a second fluid constituent in the vessel.

13. The separator of claim 12, wherein the detector comprises at least one guided wave radar detector.

14. The separator of claim 1, wherein the positioner is horizontally oriented and the collection pipe orthogonally extends outwardly from the positioner.

15. The separator of claim 1, wherein the actuator is configured to rotate the positioner about the rotational axis such that the collection pipe has the positive angle relative to the positioner such that flow is not achievable from the positioner without a pressure source.

16. A separator for separating constituents of well fluid produced by a well, the separator comprising:

a vessel for receiving well fluid such that a first fluid constituent overlies a second fluid constituent within the vessel and an interface region is disposed at a fluid interface between the first fluid constituent and the second fluid constituent;

a collection pipe having an opening for collecting the first fluid constituent from the vessel; and a positioner having a rotational axis and a coupling configured to rotationally translate the positioner about the rotational axis;

wherein the collection pipe is connected to the positioner and extends outwardly from the rotational axis, such that rotating the positioner about its rotational axis changes a height of the opening within well fluid in the vessel; and wherein the coupling is configured to rotationally translate the positioner about the rotational axis such that the collection pipe has a positive angle relative to the positioner.

17. The separator of claim 16, wherein the positioner is horizontally oriented and the collection pipe orthogonally extends outwardly from the positioner.

18. The separator of claim 16, wherein the coupling is configured to rotationally translate the positioner about the rotational axis such that the collection pipe has a positive angle relative to the positioner such that flow is not achievable from the positioner without a pressure source.

* * * * *